United States Patent Office.

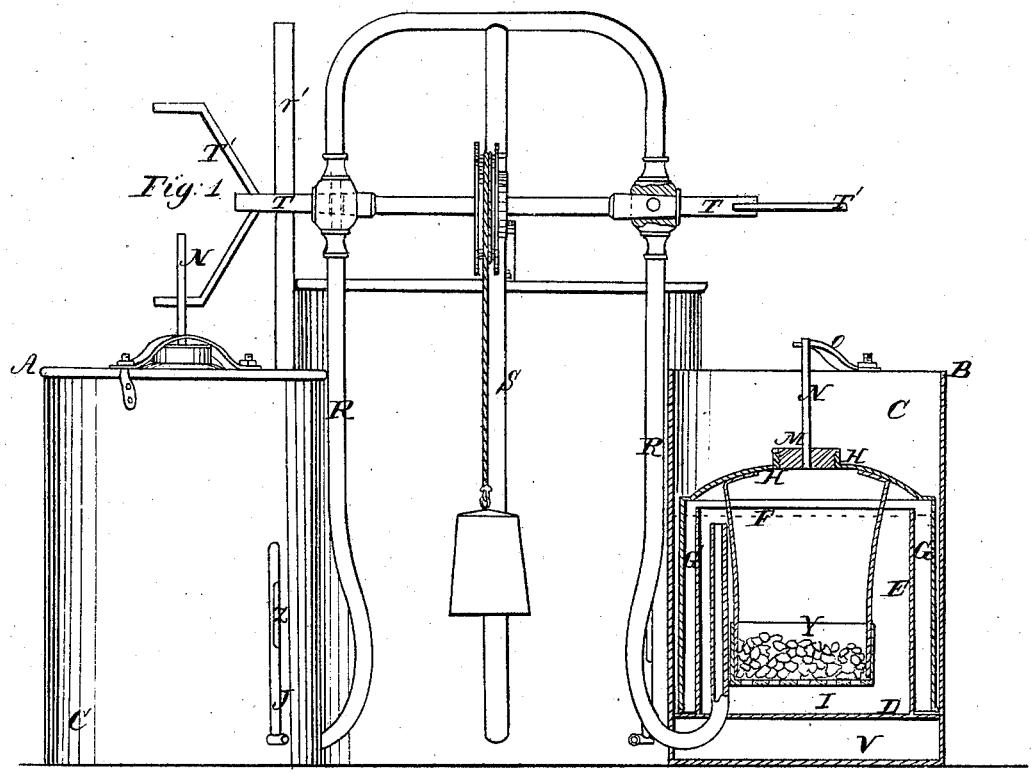

AMOS STEVENS, OF FITCHBURG, MASSACHUSETTS, ASSIGNOR TO HIMSELF AND HENRY C. MAHURIN.

Letters Patent No. 97,457, dated November 30, 1869.

---

IMPROVED APPARATUS FOR GENERATING AND CARBURETTING ILLUMINATING-GAS.

---

The Schedule referred to in these Letters Patent and making part of the same.

---

*To all whom it may concern:*

Be it known that I, AMOS STEVENS, of Fitchburg, in the county of Worcester, and State of Massachusetts, have invented certain Improvements in Apparatus for Generating and Carburetting Illuminating-Gas; and I do hereby declare that the following, taken in connection with the drawings which accompany and form part of this specification, is a description of my invention sufficient to enable those skilled in the art to practise it.

Figure 1 represents two hydrogen-gas generators, A and B, placed near each other, and constructed; in the main, exactly alike; and, being also the same in their operation, a description of one will suffice for both.

In this figure—

C is the outside cylinder, connected with the bottom D, which is set up within the cylinder, say about four inches from the bottom line.

E is another smaller cylinder, connected also with the bottom D.

These two cylinders C and E (one being within the other) have an annular space, of about two inches, between them.

This space is filled with water up to the dotted line F, or thereabout.

Standing in this water-space or chamber is another cylinder, G, attached to the raised top H, this top, with the cylinder G, being free to rise or fall, according to the amount of pressure of the gas.

I is a tank to contain a solution of acid and water.

Y is a vessel, with perforated bottom, into which is placed zinc or scrap-iron: and this vessel is suspended by straps from the top H.

The top H has a screw-cap, M, through which the zinc is passed to the vessel, as is also the solution to the tank I.

The screw-cap M is fitted with a rod, N, which passes up through the bar O.

This bar is fastened at each end by means of a screw and nut.

J is a draw-off pipe, leading from the tank I.

Into the top of this pipe is inserted a glass tube, Z, to indicate the height of the solution in the tank.

A draw-off for water, and a draw-off for any substance that may collect in the drip-pan V, may be applied at any convenient point.

P R are gas-pipes, leading from the generators to the main pipe S.

The upper end of the pipes P R are fitted with gas-cocks—one in each.

These gas-cocks are connected by a shaft between them, on which is a wheel with cords and weight.

To the ends of the gas-cocks are attached the shafts T T.

These gas-cocks are so arranged, that when one is opened, the other is closed.

On the ends of the shafts T are arms T' T', with their ends bent at right angles, to catch upon the rods N N when they are raised.

Figure 2 represents the gasometer and carburetter.

D' is the outside cylinder, with a bottom, B', set up in it, say, four inches from its base-line.

In the centre of this cylinder is placed a double cone-shaped tank, one end of which passes down through the bottom B'.

This tank is held in position by stays from the sides down to the bottom.

The space around the tank is filled with water up to the dotted line.

In this water-space stands another cylinder, P', which is attached to the top M', and is free to rise or fall, according to the pressure of gas.

R' is a bar across the top of the gasometer, fastened at each end with screw and nut. This bar prevents the float of the gasometer from being raised out of the water.

The tank or carburetter contains a portion of light petroleum-oil up to the dotted line C'.

F' is a draw-off for the oil, in the top of which may be inserted a tube, rising perpendicular, and having a cup or mouth, through which the oil is passed to the tank.

H' is a draw-off from the drip-pan O'.

The pipe S from the generators enters the carburetter at the bottom, extends to the top, and down, under the oil, to the bottom, where the gas is forced out, and rises through the oil-space above, and is taken out at the top through the pipe L', which lies coiled once around the top of the carburetter, and is perforated with numerous small holes, through which the gas is forced, and rises up, through the water that surrounds the carburetter, to the space above, prepared for use.

V' is a pipe, that conducts the gas to the burners.

When the generators, fig. 1, are charged, the floats at once rise, by pressure of gas, as does also the float of the gasometer, fig. 2, to the position shown in dotted lines, at which point the zinc is out of the solution, and the action ceases. All will remain in this position until a vent is produced by lighting the burners, when the float of that generator which, for the time being, is open to the main pipe, begins to fall, which immerses the zinc again into the solution, and more gas is formed.

Whenever the burners are closed, the float of the generator, which is then in action, at once rises, taking the zinc out of the solution, and all action ceases.

When a generator becomes exhausted, the float sinks down, and the rod N falls below the arm on the shaft T, which allows said shaft to make a quarter revolution, thus closing the gas-cock of the exhausted generator, and instantly opening the gas-cock from the other, which at once comes into action. The exhausted generator can then be recharged, when the float at once rises, and remains to be acted upon by the exhaustion of the other. Thus, in turn, the exhaustion of one generator brings the other automatically and instantaneously into action.

I claim—

1. The combination of two hydrogen-gas generators, in such a manner that the exhaustion of one brings the other automatically and instantaneously into action, by means of a partially-revolving gas-cock, with shaft and arms, operated by wheel and weight, or equivalents, substantially as herein set forth.

2. The double cone-shaped tank, placed in the centre of the gasometer, with the pipe L' coiled around the top, by which the gas is passed up through the water, as herein set forth.

AMOS STEVENS.

Witnesses:
GILES H. WHITNEY,
NATHL. WOOD.